United States Patent
Kosubek et al.

(10) Patent No.: US 10,106,126 B2
(45) Date of Patent: Oct. 23, 2018

(54) APPARATUS AND METHOD FOR DETECTING PRECIPITATION FOR A MOTOR VEHICLE

(71) Applicant: Conti Temic microelectronic GmbH, Nuremberg (DE)

(72) Inventors: Christopher Kosubek, Ulm (DE); Dieter Kroekel, Eriskirch (DE); Urban Meis, Goeppingen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 235 days.

(21) Appl. No.: 14/710,910

(22) Filed: May 13, 2015

(65) Prior Publication Data

US 2015/0332099 A1 Nov. 19, 2015

(30) Foreign Application Priority Data

May 15, 2014 (DE) .......................... 10 2014 209 197

(51) Int. Cl.
| | |
|---|---|
| *B60S 1/08* | (2006.01) |
| *G06K 9/00* | (2006.01) |
| *B60R 1/00* | (2006.01) |
| *G06T 7/20* | (2017.01) |
| *G06K 9/62* | (2006.01) |
| *G01W 1/14* | (2006.01) |

(Continued)

(52) U.S. Cl.
CPC .............. *B60S 1/0844* (2013.01); *B60R 1/00* (2013.01); *G01W 1/14* (2013.01); *G06K 9/00791* (2013.01); *G06K 9/6201* (2013.01); *G06K 9/6267* (2013.01); *G06T 7/0002* (2013.01); *G06T 7/20* (2013.01); *G06T 7/254* (2017.01); *G06T 7/50* (2017.01); *G06T 2207/30252* (2013.01)

(58) Field of Classification Search
CPC .............. B60S 1/0822; G06K 9/00791; G01N 21/4738
See application file for complete search history.

(56) References Cited

U.S. PATENT DOCUMENTS

| | | |
|---|---|---|
| 5,923,027 A | 7/1999 | Stam et al. |
| 5,987,152 A | 11/1999 | Weisser |

(Continued)

FOREIGN PATENT DOCUMENTS

| | | |
|---|---|---|
| DE | 198 03 694 | 4/1999 |
| DE | 102006016774 | 10/2006 |

(Continued)

OTHER PUBLICATIONS

German Examiner Robert Schmid, Office Action in German Patent Application No. 10 2014 209 197.7, dated Mar. 12, 2015, 6 pages, with partial English translation, 3 pages.

*Primary Examiner* — Mehrdad Dastouri
*Assistant Examiner* — Rowina Cattungal
(74) *Attorney, Agent, or Firm* — W. F. Fasse

(57) ABSTRACT

An apparatus and a method are for detecting precipitation on a windscreen of a motor vehicle. A camera device records a first image and thereafter a second image. A comparison device produces a first comparison image by comparing the first image with the second image. An image detection device identifies objects on the first comparison image, and determines motion of the objects, to detect whether there is precipitation on the windscreen.

17 Claims, 2 Drawing Sheets

(51) Int. Cl.
   *G06T 7/00*      (2017.01)
   *G06T 7/50*      (2017.01)
   *G06T 7/254*     (2017.01)

(56) References Cited

U.S. PATENT DOCUMENTS

| | | | |
|---|---|---|---|
| 6,323,477 B1 | 11/2001 | Blasing et al. | |
| 6,392,218 B1 | 5/2002 | Kuehnle | |
| 7,612,356 B2* | 11/2009 | Utida | B60S 1/0822 250/227.25 |
| 7,646,889 B2 | 1/2010 | Tsukamoto | |
| 8,274,562 B2 | 9/2012 | Walter et al. | |
| 8,541,732 B2 | 9/2013 | Rothenhaeusler | |
| 2004/0165749 A1 | 8/2004 | Holz et al. | |
| 2005/0206511 A1* | 9/2005 | Heenan | B60S 1/0822 340/438 |
| 2006/0228001 A1* | 10/2006 | Tsukamoto | B60S 1/0822 382/104 |
| 2007/0115357 A1* | 5/2007 | Stein | B60Q 1/0023 348/148 |
| 2007/0267993 A1* | 11/2007 | Leleve | B60S 1/0822 318/483 |
| 2008/0199050 A1* | 8/2008 | Koitabashi | B60R 1/00 382/107 |
| 2011/0043624 A1 | 2/2011 | Haug | |
| 2013/0027557 A1* | 1/2013 | Hirai | B60S 1/0844 348/148 |
| 2013/0235381 A1 | 9/2013 | Kroekel et al. | |
| 2014/0247357 A1* | 9/2014 | Sekiguchi | G01N 21/4738 348/148 |

FOREIGN PATENT DOCUMENTS

| | | |
|---|---|---|
| DE | 102008043737 | 5/2010 |
| DE | 102010023591 | 12/2011 |
| WO | WO 06/024247 | 3/2006 |
| WO | WO 2010/072198 | 7/2010 |
| WO | WO 2012/092911 | 7/2012 |

* cited by examiner

APPARATUS AND METHOD FOR DETECTING PRECIPITATION FOR A MOTOR VEHICLE

FIELD OF THE INVENTION

The present invention relates to a sensor system for a motor vehicle. In particular, the present invention relates to an apparatus and a method for detecting precipitation for a motor vehicle.

BACKGROUND OF THE INVENTION

WO 2012/092911 A1 describes a method for detecting rain comprising a camera and a lighting source. The camera is disposed behind a pane, in particular in the interior of a vehicle behind a windscreen and focused onto a remote region that lies in front of the pane. The lighting source for generating at least one light beam that is directed at the pane directs the at least one light beam towards the pane such that at least one beam that is reflected from the outer face of the pane impinges on the camera. The light quantity of the at least one beam that impinges on the camera can be measured by the camera.

In order to detect raindrops also at night, it is described in WO 2010/072198 A1 to couple light via a coupling element into the windscreen and to guide it via total reflection in the pane. By a decoupling element the totally reflected light is decoupled in the direction of the camera.

When there are water drops on the windscreen, a part of the light is decoupled and is no longer totally reflected to the decoupling element. It is again disadvantageous here that for each modified pane inclination the integrated camera lighting unit must be mechanically adapted to the modified installation condition.

In known active methods for rain detection a light source specifically required for this purpose is used, by which the reduction of the reflected light intensity is measured and used for rain detection. The projected light, however, encloses only a relatively small surface on the windscreen, which is used for the detection. Raindrops outside the detection surface remain undetected due to the light sources or LED-based detection method. In case of light or moderate rain it can happen that the windscreen is wetted uniformly with drops, whereas no drops fall onto the position of the detection surface. For a stable rain detection, in particular with light precipitation it is, therefore, desirable to increase the detection surface.

SUMMARY OF THE INVENTION

An object of the invention is to increase the efficiency of sensor systems.

This object can be achieved by an apparatus and a method for detecting precipitation as set forth in the independent claims. Embodiments and further developments can be taken from the dependent claims, the description and the drawings.

A first aspect of the invention relates to an apparatus for detecting precipitation on a windscreen for a motor vehicle, the apparatus comprising a camera device, which is designed such that it records an image at a first moment and a second image at a second moment following the first moment, a comparison device, which is designed such that it produces a comparison image by comparing the first image with the second image, and an image detection device, which is designed such that it identifies objects on the first comparison image.

According to the second aspect of the present invention a method for detecting precipitation on a windscreen for a motor vehicle is provided, the method comprising the following steps: recording a first image at a first moment and recording a second image at a second moment following the first moment, producing a comparison image from the first image and the second image and identifying objects on the comparison image.

Advantageous embodiments of the invention are characterized in the dependent claims.

In at least one embodiment of the invention, for increasing the detection surface area, the entire image of a camera device or of a camera may be used. The field of view of a camera, which is used for traffic sign detection, for a lane change assistant or for a blind spot monitoring or for any other driver assistance function in the vehicle, provides a detection surface area which is increased in size compared to an LED-based reflection sensor, so that a probability of occurrence of a precipitation drop in the entire image is clearly higher than the probability of occurrence of a drop in the smaller detection surface area covered by the LEDs.

The camera is located for example at the windscreen of the vehicle and additionally focused onto the far range.

The present invention permits advantageously that the camera can continue to be used as an environment sensor for driver assistance systems. The objects to be detected such as e.g. lane markings, traffic signs, other road users, etc. lie in the far range of the camera compared to the windscreen and can be imaged by the camera in a focused manner, so there is no more need for focusing the camera to different distance regions.

This, however, leads to a blurred representation without contours of the drops in the images recorded by the camera device. The drops adhering to the windscreen or any other impurities can be seen in the image as small defects or intensity fluctuations or distortions, as the optical image path is slightly changed by the drops.

In addition, the drops separated on the windscreen can lead to brightness changes in the recorded image by light coupling caused by refraction or any other optical effects.

Using the entire image for detecting precipitation on the windscreen can increase the detection surface many times over, however, for this purpose a method adapted to the present invention for reliable detection of raindrops under unfocussed conditions is necessary.

The present invention permits advantageously to provide rain detection without any lighting of the windscreen.

The present invention uses a comparison of two single images recorded at different times. If as a result of the prevailing rain a drop is incident on the viewing range of the camera device within the time offset of the two recorded images, then by the described intensity change the drop will become visible in the difference image of the two images. The advantage of this method of the present invention is the reduction of the computing effort needed to detect the drop.

Admittedly, also moving objects will become visible in the difference image. Other changes in the camera image, not resulting from the precipitation, lead to disturbances of the rain detection and must be distinguished from potential drops.

Advantageously, horizontally moving objects can be ignored in the rain detection. In particular with stationary objects and light rain the detection probability is strongly reduced with a small detection surface.

Typically, with a stationary vehicle, the observed movements of other traffic participants run at right angles to the vehicle or comprise at least a transverse component of its motion vector, e.g. in case the vehicle stands at the traffic light and pedestrians cross the road. Here, it is assumed that only horizontally moving objects are regarded as being disturbing for the precipitation detection.

Horizontal movements of identified objects can be detected and filtered from recorded pictures or images via conventional methods of image processing, such as e.g. tracking over several images, and thus can be distinguished from drops, which either newly impinge on the pane, hence are new or which, as a rule, move from top to bottom in the camera image.

Advantageously, objects that are moving or running diagonally can be ignored. The method of ignoring horizontally running objects can be extended to a moving ego-vehicle, in which the apparatus according to the present invention is used.

The self-motion of the ego-vehicle causes additional motion vectors of the objects that appear in the image, which run transversely and diagonally from the vanishing point to the side. These motions can also be filtered to distinguish them from changes in the image caused by raindrops.

Specifically with a very light precipitation an increased detection surface and a high detection quality is desirable, as in this case only occasional raindrops reach the detection surface.

Advantageously, blurred edges can be observed. The blurred representation of the drops leads to a softening of the edges in the background. Sharp edges in the background can be considered temporally to detect a possible blurring by drops.

Further, clear features in the difference image can be classified. Another option is to classify objects into drops and non-drops. For this purpose, features which are clear and to be verified by the image detection device for a drop can be defined in the difference image or picture.

A corresponding classifier then distinguishes in the difference image whether the features of a shown object corresponds to the drop features or not. This would have the advantage that objects from all directions can be ignored.

The invention represents a simple but reliable option to detect rain with a vehicle camera, in particular with a driver assistance camera.

The present invention permits advantageously to measure the wetting of a measuring field defined by the field of view of the camera and further permits to estimate the wetting of the pane and for example to activate a windscreen wiper of the vehicle, when an appropriate wetting is reached.

In other words, a core idea of at least one embodiment of the present invention can be that image regions are observed, in which impinging of moving objects is unlikely. These can be e.g. sky regions, engine covers or corners of the image.

With this embodiment the present invention advantageously allows an increase of the detection surface by using the entire camera image.

The present invention permits advantageously that a robust distinction between drop and other background objects can be made.

According to an advantageous further development the other, still sharply shown background objects could, however, be considered for one or more driver assistance function(s).

In an advantageous embodiment of the present invention it is provided that the image detection device is designed such that it determines a movement of at least one object from the amount of identified objects. This can be made e.g. when comparing the first image with the second image by the comparison device. The comparison image thus can provide information which image points contain an object point in the first image and no longer in the second image or vice versa. In the first case the object would have moved away from this image point, in the reverse case the object would have moved towards this image point or it newly appeared at this image point.

This permits in a comparably easy way to detect the movements of objects.

In an advantageous embodiment of the present invention it is provided that the comparison device is designed such that it produces a difference image as a first comparison image.

This permits in an easy way to detect changes of objects and appearance of new objects.

In an advantageous embodiment it is provided that the camera device is designed such that it records subsequent to the second image one or more images as a third image or as further images.

This results advantageously in an increased reliability of a motion detection of the identified objects and the determination of a motion direction of the identified objects.

In an advantageous embodiment of the present invention it is provided that the comparison device is designed such that it produces a second comparison image by comparing the second image with the third image.

This permits in an easy way to identify objects reliably.

In an advantageous embodiment of the present invention it is provided that the image detection device is designed such that it detects a movement of an object from the amount of identified objects by comparing the first comparison image with the second comparison image.

In an advantageous embodiment of the present invention it is provided that the image detection device is designed such that it detects one or that movement of an object from the amount of identified objects by comparing the first image with the second image.

Here, different methods for motion detection can be combined or used for cross-checkings.

This permits advantageously to detect the movement of the objects with a reduced computing effort of the image detection device or of the comparison device.

In an advantageous embodiment of the present invention it is provided that the image detection device is designed such that it assigns a motion direction to the detected motion of the object and identifies the object on the basis of the associated motion direction.

This increases advantageously robustness or reliability of the method for raindrop detection as performed by the apparatus for detecting precipitation.

In an advantageous embodiment of the present invention it is provided that the image detection device is designed such that it classifies the identified objects on the first comparison image.

The objects to be classified, for example raindrops or non-raindrops, such as motor vehicles or pedestrians, are described by their features or characteristics.

These features are recognized by the image detection device and span an n-dimensional feature space. An object, for example a raindrop, thus is represented by a certain expression of the features $1, \ldots, n$, i.e. by a feature vector in the feature space.

In an advantageous embodiment of the present invention it is provided that the image detection device is designed such that it classifies the identified, objects on the first comparison image on the basis of the form of the identified objects.

In an advantageous embodiment of the present invention it is provided that the camera device is designed such that it records the images with a predefined depth of field and that the image detection device is designed such that it identifies the objects within and outside the predefined depth of field.

This permits advantageously to determine whether and if so, how much rain or how much other precipitation in form of flies, midges and other insects or dust lies on the windscreen.

In an advantageous embodiment of the present invention it is provided that the image detection device is designed such that it classifies the identified objects on the first comparison image on the basis of a local frequency of the identified objects. The local frequency or spatial frequency is the reciprocal value of the spatial period length of an object.

In an advantageous embodiment of the present invention it is provided that the camera device is designed such that it records the first image and the second image without any lighting. For the apparatus according to the invention for detecting precipitation on the windscreen of a vehicle no active lighting of the windscreen is required in accordance with this preferred embodiment. By comparing two or more images also in the unlighted condition changes based on precipitation on the pane can be reliably detected. It can be assumed that in darkness the headlights of the own vehicle are activated, so that the camera can record images with sufficient intensity.

This permits advantageously to do without an additional light source and permits a power-saving raindrop detection. Further, this permits a higher traffic security, as unnecessary light sources are avoided, which could confuse other traffic users.

The described embodiment and further developments can be combined in any way.

Further possible embodiments, further developments and implementations of the invention comprise also not explicitly mentioned combinations of features of the invention described above or in the following in relation to the exemplary embodiments.

BRIEF DESCRIPTION OF THE DRAWINGS

The enclosed drawings shall provide further understanding of the embodiments of the invention. The enclosed drawings demonstrate the embodiments and serve in context with the description of the explanation of concepts of the invention.

Other embodiments and many of the mentioned advantages result from the drawings. The shown elements of the drawings are not necessarily shown to scale.

DETAILED DESCRIPTION OF THE PREFERRED EMBODIMENTS

Figure 1:
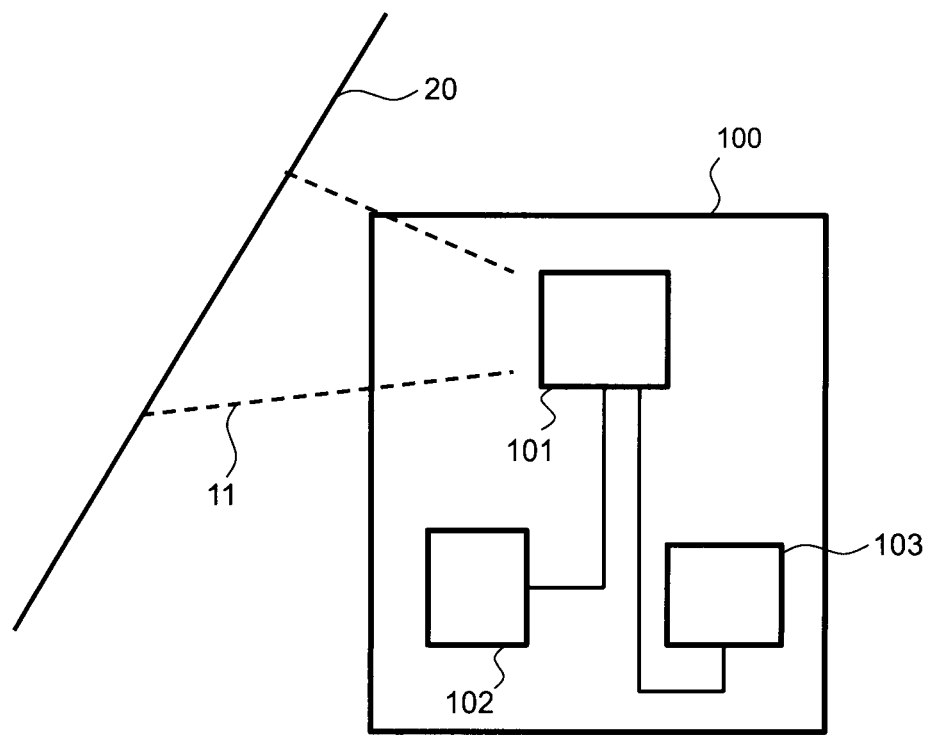
FIG. 1 shows a schematic view of an apparatus for detecting precipitation according to an embodiment of the invention.

In the figures of the drawings identical and/or functionally identical elements, parts, components or method steps are referred to by the same reference numerals, unless otherwise indicated.

FIG. 1 shows a schematic view of an apparatus for detecting precipitation according to an embodiment of the invention.

An apparatus 100 for detecting precipitation for a motor vehicle comprises for example a camera device 101, a comparison device 102, and an image detection device 103.

The camera device 101 can be designed for example such that it records a first image at a first moment and a second image at a second moment following the first moment.

The camera device 101 can be embodied as an optical camera and is disposed for example behind a pane or windscreen 20, in particular in the interior of a vehicle, e.g. behind a windscreen, and focused onto a remote region that lies in front of the pane or windscreen 20. The camera preferably comprises an objective used for focusing and an image sensor, e.g. a CCD sensor or CMOS sensor and can record images within an image angle region or spatial angle referred to as image angle 11.

The comparison device 102 can be designed for example such that it produces a first comparison image by comparing the first image with the second image.

The image detection device 103 can be designed such that it identifies objects on the first comparison image.

The camera device 101 can be designed such that it records the images with a predefined depth of field and the image detection device 103 can be designed such that it identifies the objects within and outside the predefined depth of field.

For example the depth of field or focal depth can be defined as a measure for the expansion of the sharp region in the object space of a copied optical system, the camera device. The focal depth describes the quantity of the distance range, within which an object appears sufficiently sharp in the image of the camera optics.

For example a large depth of field is obtained by small camera apertures or objectives with short focal lengths.

In this case the focal depth of the camera device 101 can reach from approx. 5 m to 100 m or from 8 m to 200 m or from 12 m to infinity.

Figure 2:
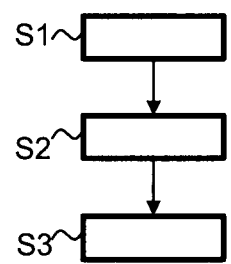
FIG. 2 shows a schematic view of a flow chart of a method for detecting precipitation for a motor vehicle according to a further embodiment of the invention.

FIG. 2 shows a schematic view of a flow chart of a method for detecting precipitation for a motor vehicle according to a further embodiment of the invention.

The method for detecting precipitation for a motor vehicle comprises the following steps:

A first step of the method comprises recording S1 of a first image at a first moment and recording of a second image at a second moment following the first moment.

A second step of the method comprises producing S2 a comparison image from the first image and the second image.

A third step of the method comprises identifying S3 of objects on the comparison image.

The method steps can be repeated iteratively or recursively and in any sequence.

Figure 3:
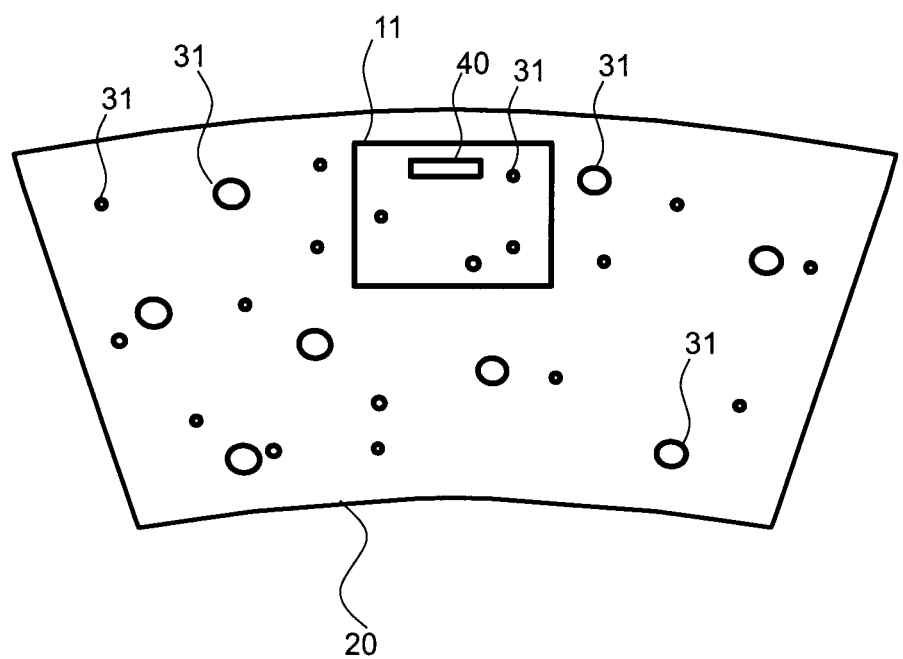
FIG. 3 shows a schematic view of a windscreen for explaining the invention.

FIG. 3 shows a schematic view of a windscreen for explaining the invention. FIG. 3 shows in particular a simplified representation of the drop distribution with light or moderate rain. With a precipitation intensity of up to 0.2 millimeters per hour one can speak of a light drizzle, with 0.2 to 0.5 millimeters per hour of a moderate drizzle, and with over 0.5 millimeters per hour of a heavy drizzle.

A detection surface 40 of a comparative LED-based detection apparatus is shown on the windscreen 20 in FIG. 3 for purposes of comparison and explanation.

The raindrops 31 outside the detection surface 40 remain undetected by the LED-based detection method. With a light to moderate rain it can happen that the windscreen 20 overall is uniformly wetted with drops, whereas no drops fall onto the detection surface 40 as is shown in FIG. 3.

For a stable rain detection in particular with light precipitation it is, therefore, desirable to increase the size or area of the detection surface.

The increased detection surface 11 of the camera device 101, which is defined by the field of view or image angle 11 of the camera device 101, makes it possible to detect raindrops 31 even with a light or low precipitation intensity.

Although the present invention was described above on the basis of preferred exemplary embodiments, it is not restricted thereto, but is modifiable in many ways. In particular, the invention can be changed or modified in various ways without deviating from the core of the invention.

In addition, it may be pointed out that "including" and "comprising" do not exclude other elements or steps and "one" does not exclude a plurality.

Further, it may be pointed out that the features or steps, which were described with reference to one of the above exemplary embodiments, can be used also combined with other features and steps of other exemplary embodiments described above. Reference numerals in the claims are not to be considered as restrictions.

The invention claimed is:

1. An apparatus for detecting precipitation on a windscreen of a motor vehicle, the apparatus comprising:
   a camera device configured to record a first image and thereafter a second image;
   a comparison device configured to produce a first comparison image by comparing the first image with the second image; and
   an image detection device configured to detect objects in the first comparison image, and to determine a respective apparent motion and a respective apparent motion direction of moving objects among the detected objects, and to classify some of the moving objects respectively as being either precipitation drops on the windscreen or non-precipitation objects in an outside environment of the motor vehicle based on consideration of at least the respective motion direction thereof;
   wherein the moving objects include first moving objects of which the respective motion direction includes a lateral or horizontal motion component, and second moving objects of which the respective motion direction does not include a lateral or horizontal motion component, and
   wherein the image detection device is further configured so that the classifying of the moving objects based on consideration of the respective motion direction thereof comprises ignoring or filtering-out the first moving objects and further classifying only the second moving objects as being either the precipitation drops or the non-precipitation objects.

2. The apparatus according to claim 1, wherein the comparison device is further configured to produce a difference image as the first comparison image.

3. The apparatus according to claim 1, wherein:
   the camera device is further configured to record a third image following the second image;
   the comparison device is further configured to produce a second comparison image by comparing the second image with the third image; and
   the image detection device is further configured to determine the respective apparent motion and the respective apparent motion direction of the moving objects by comparing the first comparison image with the second comparison image.

4. The apparatus according to claim 1, wherein the image detection device is further configured to determine the respective apparent motion and the respective apparent motion direction of the moving objects by comparing the first image with the second image.

5. The apparatus according to claim 1, wherein the image detection device is further configured to classify the detected objects other than the moving objects in the first comparison image.

6. The apparatus according to claim 1, wherein the image detection device is further configured to classify the detected objects based on consideration of respective shapes of the detected objects.

7. The apparatus according to claim 1, wherein the image detection device is further configured to classify the detected objects based on consideration of respective local frequencies of the detected objects in the first comparison image.

8. The apparatus according to claim 1, wherein the camera device is further configured to record the images with a predefined depth of field, and the image detection device is further configured to classify the detected objects based on consideration of whether a respective one of the detected objects lies within or outside the predefined depth of field.

9. The apparatus according to claim 1, wherein the camera device is further configured to record the images without the apparatus applying any active lighting.

10. The apparatus according to claim 1, wherein the camera device is further configured to record the images and the image detection device is further configured to perform the classifying when the motor vehicle is stationary.

11. The apparatus according to claim 1, wherein the camera device is further configured to record the images and the image detection device is further configured to perform the classifying when the motor vehicle is moving with a vehicle motion, and to filter out motion components of the respective apparent motion of the moving objects caused by the vehicle motion before the classifying of the moving objects.

12. A method of detecting precipitation on a windscreen of a motor vehicle, the method comprising the following steps performed with a driver assistance system of the vehicle:
   with a camera of the driver assistance system recording a first image and thereafter a second image;
   producing a comparison image from the first image and the second image;
   identifying objects in the comparison image;
   determining a respective apparent motion and a respective apparent motion direction of moving objects among the identified objects, wherein the moving objects include first moving objects of which the respective motion direction includes a lateral or horizontal motion component, and second moving objects of which the respective motion direction does not include a lateral or horizontal motion component; and
   classifying some of the moving objects based on consideration of at least the motion direction thereof, comprising ignoring or filtering-out the first moving objects and then further classifying the second moving objects to determine whether the second moving objects represent environment objects in an outside environment in front of the motor vehicle or represent precipitation drops on the windscreen.

13. A method of detecting precipitation on a windscreen of a motor vehicle, the method comprising the following steps performed with a driver assistance system of the motor vehicle:

a) with a camera of the driver assistance system having a field of view directed through the windscreen and focused in an outside environment in front of the motor vehicle, recording a first image and thereafter a second image;
b) evaluating the images and detecting therein moving objects that have moved in the second image relative to the first image;
c) determining a respective motion direction of the moving objects;
d) among the moving objects, determining first moving objects of which the respective motion direction is horizontal and determining second moving objects of which the respective motion direction does not include a lateral or horizontal motion component; and
e) performing a rain detection procedure on the second moving objects, and ignoring or filtering-out the first moving objects from the rain detection procedure, wherein the rain detection procedure comprises classifying the second moving objects to determine whether the second moving objects represent physical objects in the outside environment in front of the motor vehicle or represent precipitation drops on the windscreen.

14. The method according to claim 13,
wherein the step d) further includes determining, among the moving objects, third moving objects of which the respective motion direction is a diagonal motion direction; and
wherein the step e) further involves ignoring or filtering-out the third moving objects from the rain detection procedure.

15. The method according to claim 13, performed when the motor vehicle is stationary.

16. The method according to claim 13, performed when the motor vehicle is moving with a vehicle motion, wherein the method further comprises filtering-out motion components caused by the vehicle motion in the respective motion directions of the moving objects before performing the steps d) and e).

17. The apparatus according to claim 1, wherein the image detection device is configured to detect the detected objects in the first comparison image by detecting new objects that are present in the second image but are not present in the first image, whereby the new objects appear in the first comparison image.

* * * * *